United States Patent
Tahir et al.

(10) Patent No.: US 7,219,688 B2
(45) Date of Patent: May 22, 2007

(54) FLUID CONTROL VALVE

(75) Inventors: Nadim Tahir, Rotherham (GB); James Francis McKeever, Belfast (GB)

(73) Assignee: AES Engineering Limited, Rotherham (GB)

( * ) Notice: Subject to any disclaimer, the term of this patent is extended or adjusted under 35 U.S.C. 154(b) by 206 days.

(21) Appl. No.: 10/929,729

(22) Filed: Aug. 30, 2004

(65) Prior Publication Data

US 2005/0092368 A1    May 5, 2005

(30) Foreign Application Priority Data

Aug. 28, 2003  (GB) ................. 0320170.4

(51) Int. Cl.
*F16K 17/30* (2006.01)

(52) U.S. Cl. ............. 137/462; 137/517; 137/557

(58) Field of Classification Search ........ 137/460, 137/462, 517, 557
See application file for complete search history.

(56) References Cited

U.S. PATENT DOCUMENTS

| 2,867,234 A | * | 1/1959 | Billington | .......... 137/505.11 |
|---|---|---|---|---|
| 3,621,873 A | * | 11/1971 | Kenann et al. | .......... 137/495 |
| 3,820,565 A | | 6/1974 | Durbin | |
| 5,279,326 A | * | 1/1994 | Lin | .......... 137/460 |
| 5,280,804 A | | 1/1994 | Takashima | |
| 5,456,281 A | * | 10/1995 | Teay | .......... 137/505.12 |
| 2002/0092566 A1 | * | 7/2002 | Rhone et al. | .......... 137/517 |

FOREIGN PATENT DOCUMENTS

| EP | 1396774 A1 | 3/2004 |
|---|---|---|
| GB | 2381838 A * | 5/2003 |

* cited by examiner

*Primary Examiner*—Stephen M. Hepperle
(74) *Attorney, Agent, or Firm*—Edward D. Schindler

(57) ABSTRACT

A fluid flow control valve includes a housing having a fluid inlet and a fluid outlet, which define a flowpath therebetween. Within the housing is a chamber located in the flowpath between the fluid inlet and the fluid outlet. A valve member is mounted within the chamber from movement between an open position, allowing for flow along the flowpath, and a closed position, which prevents such flow. The valve member is biassed to the open position. The fluid control valve further includes a device for regulating fluid pressure to enable the fluid pressure to be set on the inlet side of the valve member.

11 Claims, 2 Drawing Sheets

FLUID CONTROL VALVE

FIELD OF THE INVENTION

This invention relates to fluid control valves and, in particular, to valves which will reduce or cut off fluid flow as and when it becomes excessive.

Reference will be made hereinafter to valves forming part of water management systems for use with mechanical seals. However, it should be understood that the present invention has application in connection with fluids generally including liquid fluids, for instance water and oil and gaseous fluids including air. By way of example, the present invention has application with domestic water systems where it may be used to deal with, for instance, a mains water burst. As a further example the present invention may be used to control airflow in a factory airline.

BACKGROUND OF THE INVENTION

In certain types of mechanical seal, so-called barrier or buffer fluids are used to contain the process fluid. The barrier or buffer fluid is managed within a seal support system including a vessel or tank containing a volume of the fluid, generally water. The vessel is connected to the sealing device which may be situated in a pump, mixer or other item of rotating equipment. Normally a return pipe feeds water back to the vessel from the sealing device, thereby forming a "loop" whereby the water, contained in the vessel, may enter and exit the sealing device. The purpose of the barrier fluid, whether water or some other fluid, is to lubricate and cool the components within the sealing device, while at the same time being compatible with the process fluid.

Generally the sealing device on the item of rotating equipment is a mechanical seal having a rotating member secured to a shaft and a stationary member which is secured to a housing. The interface, between the rotating member and the stationary member, prevents the process fluid from escaping. Most mechanical seals have a fluid film, acting between the two sliding seal faces. Thus fluid film lubricates the seal faces but there will be a tendency for the fluid to leak, the amount of leakage depending on the gap between the two sliding faces. Furthermore, pressure surges and sudden rises in fluid temperature can result in barrier fluid loss. In addition further loss of fluid from the vessel may be due to evaporation.

GB-A-2381838 discloses a water management system, for use with a mechanical seal, which ensures that, if the seal fails, the water flow into the system is stopped, thereby minimizing product contamination or "watering down".

This system functions well except when a particular situation may arise. If the faces of a mechanical seal are forced apart, as a result of a process upset, a significantly increased barrier fluid flow takes place. This excessive flow is detected and the device operates so as not to allow any more barrier fluid to enter the system. If the faces of a mechanical seal then return to their normal working positions, and there is no damage to the mechanical seal, the seal will continue to run without any further barrier fluid entering the system. As a result the seal will run dry and fail.

STATEMENTS OF THE INVENTION

The present invention provides a fluid flow control valve comprising a housing having a fluid inlet and a fluid outlet and defining a flowpath therebetween, said housing having a chamber located in said flowpath between said inlet and said outlet, a valve member located within the chamber for movement between an open position allowing flow along said flowpath and a closed position preventing such flow, means biasing said valve member to the open position, and a fluid pressure regulating means to enable a fluid pressure to be set on the inlet side of the valve member.

Preferably the biasing means comprise first biasing means urging the valve member towards the open position and second biasing means urging the valve member to the closed position, said biasing means being arranged to be balanced when the valve member is in the open position. More preferably each of said first and second biasing means is a spring. However, other biasing means can be used including one or more magnets.

Preferably the valve includes means preventing fluid flow along the flowpath from the outlet towards the inlet.

Preferably the valve includes by-pass means for allowing fluid to flow from the inlet to the outlet while the valve member is in the closed position. More preferably the by-pass means is adjustable between an open position permitting such by-pass flow and a closed position when such by-pass flow is prevented. More preferably the by-pass means is adjustable over a range of open positions whereby the extent of such by-pass flow may be varied.

Preferably the valve is provided with visual indication means for indicating whether the valve member is in an open or a closed position.

Preferably the valve is provided with pressure indicating means for indicating pressure at the outlet side of the valve member.

In a particular embodiment of the present invention, there is provided a seal support system comprising a vessel for holding barrier fluid, means for feeding barrier fluid between said vessel and a mechanical seal, said vessel having an inlet for the supply of barrier fluid to the vessel from a barrier fluid source, and a valve according to any of the preceding claims for fluid flow connection between said barrier fluid source and said inlet and for control of fluid supply to the vessel via said inlet.

DETAILED DESCRIPTION OF THE INVENTION

The invention will now be described, by way of example only, and with reference to the accompanying drawings.

Figure 1:
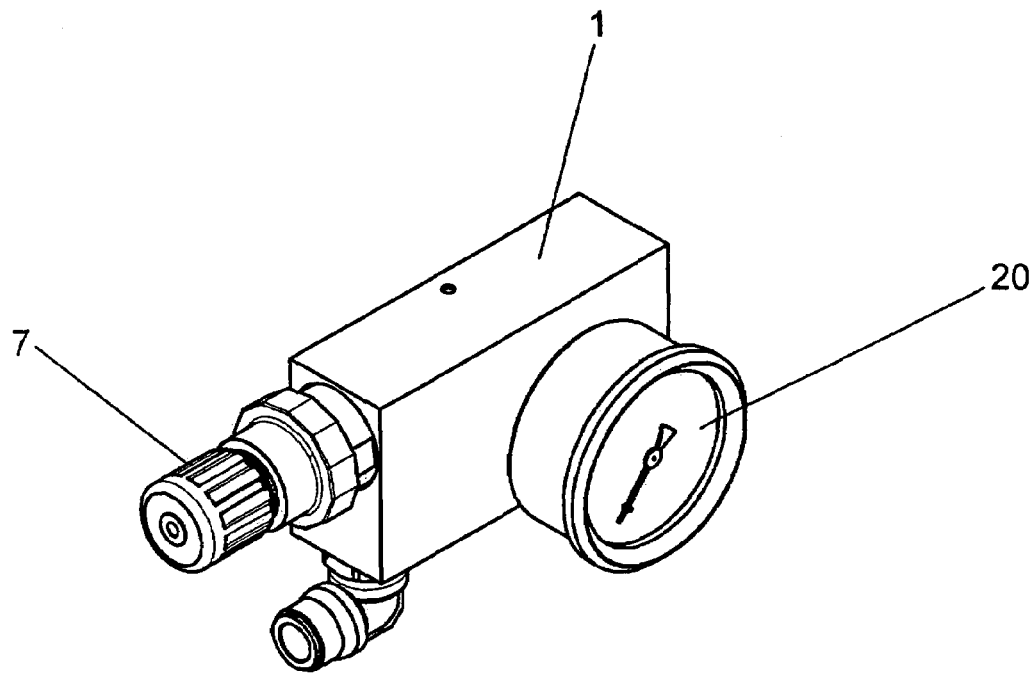
FIG. 1 is an isometric view of a valve in accordance with the present invention.
Figure 2:
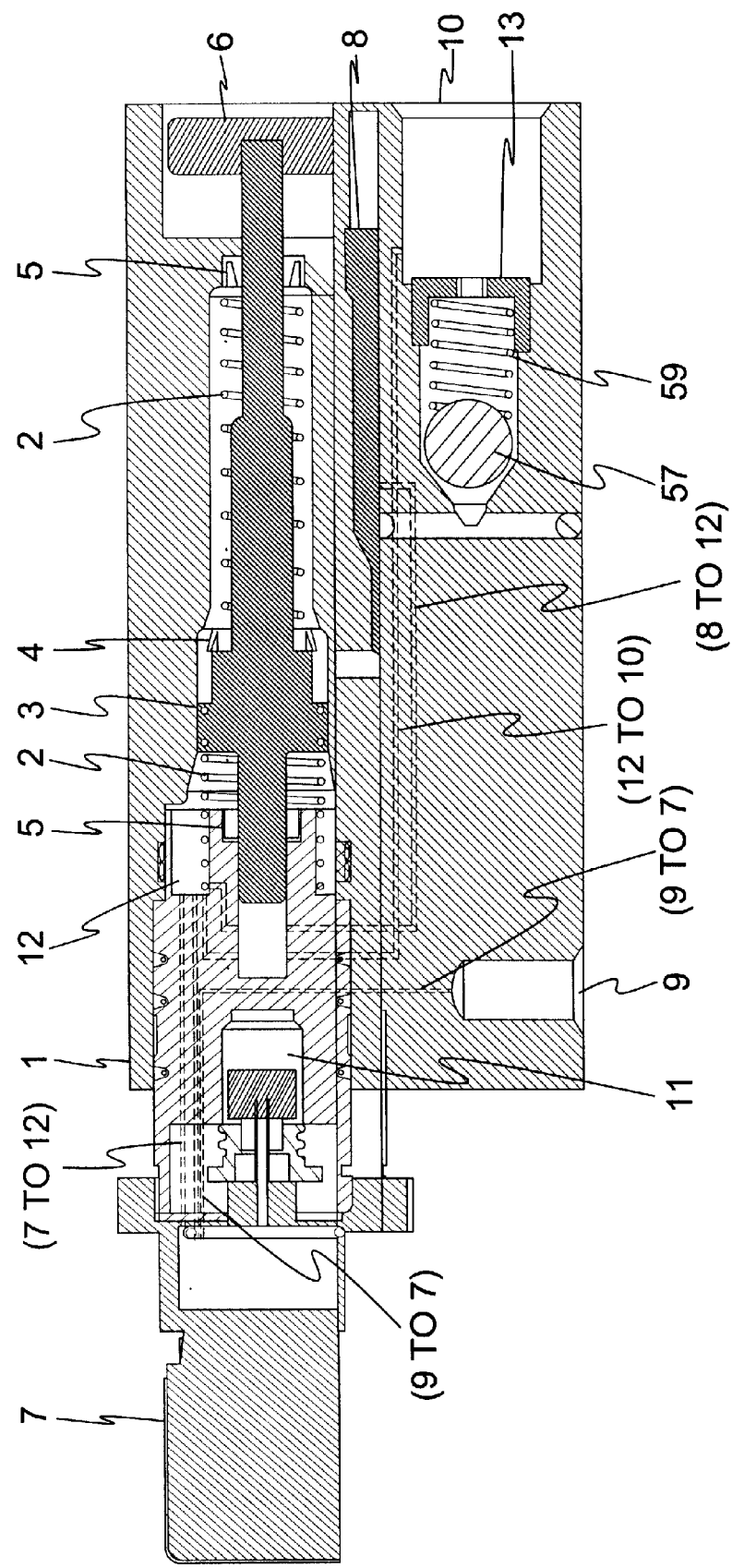
FIG. 2 is a vertical longitudinal section through the valve of FIG. 1.

Referring to FIGS. 1 and 2 of the accompanying drawings, a valve in accordance with the present invention includes a housing 1 in the form of a metal body which has a fluid inlet 9 and a fluid outlet 10. Between the fluid inlet 9 and the fluid outlet 10, the housing defines a flowpath which includes a chamber 12 within which is located a valve member in the form of piston 3. Piston 3 is in the form of a profiled elongate rod mounted fox a longitudinal movement within chamber 3. It is held in place between two chevron cross-section packing rings 5. Piston 3 is also provided with a further chevron packing ring 4 which acts to close the flowpath when the valve member moves from its open position, as illustrated, to a closed position to the right (as seen in FIG. 2) of the open position.

Mounted about piston 3, to either side of its enlarged central portion, are two, oppositely acting compression springs 2. These springs 2 are arranged such that, with no other forces acting on piston 3, they are balanced with the piston in the position shown in FIG. 2, that is to say, in an open position allowing fluid flow through the chamber 12.

The right-hand end of piston 3 is provided with a coloured button 6, the position of which visually indicates the position of the piston 3 within chamber 12 and thereby indicates the extent of flow of fluid through the valve.

An integral pressure regulator 7 (of standard design) is situated at the inlet side of the valve 1. Pressure regulator 7 is provided with a dialed knob allowing the required working pressure of the device to be set.

Also contained within housing 1 of the valve is a by-pass passage leading from chamber 12 to outlet 10 and which is controlled by a needle valve 8. This by-pass passage connects the inlet port 9 directly to the outlet port 10, providing a small leak path which by-passes the piston 3.

Also located within the housing 1 of the valve of the invention is a non-return valve 13 which prevents back flow from the vessel through the valve of the invention. In addition, a pressure gauge 20 is connected to valve housing 1 (as indicated in FIG. 1) and indicates the pressure at the outlet side of the valve.

Figure 3:
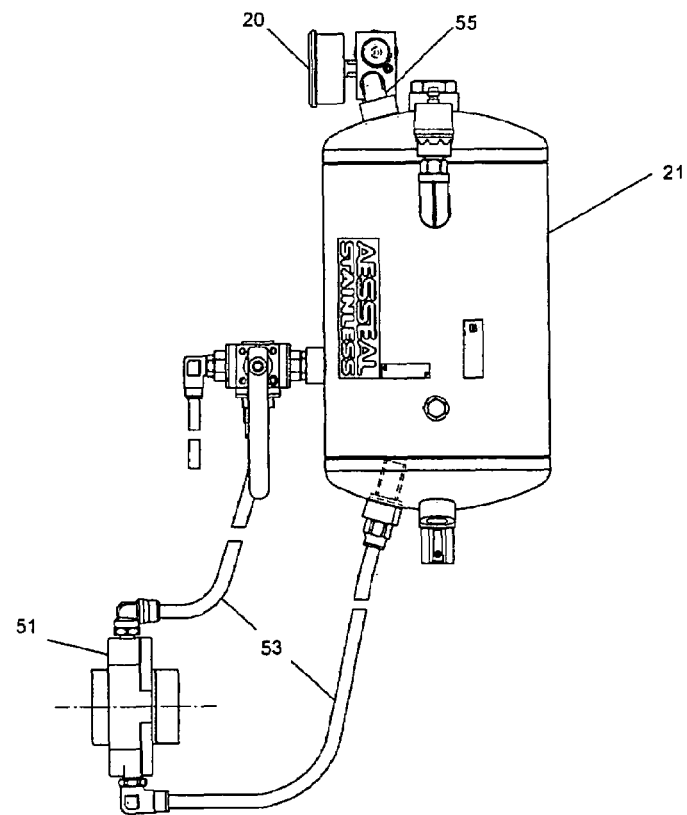
FIG. 3 shows a seal support system incorporating the valve of FIG. 1.

Referring to FIG. 3 of the accompanying drawings, a water management system for controlling the supply of barrier fluid to a mechanical seal 51 includes a pressure vessel 21 for holding barrier fluid (water) and pipes 53 interconnecting vessel 21 with mechanical seal 51 whereby water may be fed therebetween.

The above described valve is connected to the top of pressure vessel 21 by means of an elbow connector 55 extending between outlet 10 of the valve and the interior of the vessel. Inlet 9 of the valve is in turn connected to mains water supply (not shown).

In use a fluid supply, which may be barrier fluid, for instance water, for use with a mechanical seal, is connected to the inlet port 9.

Pressure regulator 7 is adjusted to give the required working pressure of the device. For instance, main supply water connected to inlet 9 may have a pressure of 6 bar whereas the pressure regulator is used to control the pressure at a value of 4 bar.

The regulated fluid enters the piston chamber 12 via the inlet 11 to chamber 12. Initially piston 3 sits in the intermediate (loaded or open) position as illustrated in FIG. 2, due to the mechanical balance imposed by the two springs 2. When the fluid enters the piston chamber 12, this balance is disturbed due to the pressure exerted on the piston 3 from the entering fluid. As a result, the piston is moved into the closed position, when chevron ring 4 engages the chamber wall and seals the chamber so that no further fluid issues from outlet 10.

In order to fill a vessel to which the outlet 10 of the valve may be connected (to be described below) manual re-set button 6 is pushed in a direction into the housing 1 and is then held. This allows fluid through the outlet 10 and into the vessel. The button 6 may be held in the depressed position until the pressure in the vessel is equal to the regulated pressure in piston chamber 12. The pressure in the vessel is indicated by pressure gauge 20. At this point mechanical/hydraulic balance is achieved again and the operator can release the manual re-set button 6, the piston 3 remaining in its intermediate (loaded) position.

Should there be a sudden decrease in the pressure in vessel 21, or a sudden flow through the valve, then the piston 3 will move to the right and will close the flowpath through chamber 12, thereby stopping any further flow from the inlet port 9 to the outlet port 10.

Normal operation can be restored in one or two ways. With the needle valve 8 in its closed position, the re-setting of the valve is carried out manually. The manual re-set button 6 is depressed so as to cause flow through the valve. Button 6 is maintained in the depressed position until the pressure in vessel 21 reaches the same pressure as that in chamber 12. The button 6 may then be released.

The valve may, however, be used in an automatic re-load mode. To achieve this mode the needle valve 8 is adjusted from its closed position to an open position. The open position may be carried so that the flow through the by-pass passage may be adjusted to whatever rate is desired. With the re-set valve in the open position fluid will leak through the by-pass passage directly to the outlet 10, thereby by-passing the closed piston 3. As the amount of fluid leaked into the vessel through the by-pass passage increases, the pressure in the vessel will also increase until it becomes equal to the pressure in the chamber 12. In this way hydraulic balance is once again achieved at which point the piston 3 has returned to its intermediate (loaded) position.

In this automatic re-load mode, the valve is, in effect, an intelligent system which detects whether the loss of pressure/increased flow was due to a temporary seal upset, rather than a catastrophic failure. If the former the automatic re-load results in the re-establishment of the mains fluid connection.

The non-return valve 13, which includes a rubber ball 57 biased into a closed position by spring 59, ensures that, should there by an increase in pressure within the pressure vessel 21, no water from the vessel will enter the pressure regulator 7 and/or the fluid supply via the inlet port 9, thereby maintaining the integrity of the mains fluid supply.

The use of the manual re-set button 6 allows the user to fill the vessel at the full flow rate when it is being filled from empty. This allows a very quick initial filling of the vessel to be effected, a process which can be lengthy (in excess of five minutes) with prior art systems. A further advantage of the valve of the system is that it is a fully integrated system having the components located within the housing or attached thereto. Accordingly, there is no requirement for an external pressure line requiring a tapping from the front of the pressure vessel. Such pipework could not be used in certain arduous environments without incurring damage which causes the unit to malfunction. The present invention incorporates the tapping within itself and therefore has no need for an external pressure tapping.

Because the valve of the invention incorporates a facility whereby the fluid flow rate before activation may be adjusted, the same valve may be used in applications where a few drops of barrier fluid per minute cannot be tolerated and also in applications where a few litres of barrier fluid per minute are appropriate. Accordingly, the valve of the present invention is in effect a hydraulic fuse protecting the fluid system to which it is connected. In one embodiment, the fuse may be manually re-set. In another it may be automatically re-set, as described above, and, also as described above, it may be capable of operating in both modes.

What is claimed is:

1. A seal support system, comprising:
   a vessel for holding barrier fluid, said vessel having an inlet for a supply of said barrier fluid to said vessel from a barrier fluid source;

means for feeding said barrier fluid between said vessel and a mechanical seal; and, a fluid control valve for fluid connection between said barrier fluid source and said inlet for said supply of said barrier fluid, and for controlling said supply of barrier fluid to said vessel via said inlet, said fluid control valve including:

a housing having a fluid inlet and a fluid outlet defining a flowpath therebetween, said housing having a chamber located in said flowpath between said fluid inlet and said fluid outlet;

a valve mounted within said chamber for movement being an open position allowing for fluid along said flowpath and a closed position for preventing said flow;

means for biassing said valve toward said open position;

means for regulating fluid pressure for enabling the fluid pressure to be set on an inlet side of said valve; and, means for biassing said valve toward said closed position, said means for biassing said valve toward said open position and said means for biassing said valve toward said closed position being balanced when said valve is in said open position.

2. The seal support system according to claim 1, wherein said means for biassing said valve toward said open position and said means for biassing said valve toward said closed position include spring biassing means.

3. The seal support system according to claim 1, wherein said valve of said fluid control valve includes means for indicating pressure at an outlet side of said valve.

4. A seal support system, comprising:

a vessel for holding barrier fluid, said vessel having an inlet for a supply of said barrier fluid to said vessel from a barrier fluid source;

means for feeding said barrier fluid between said vessel and a mechanical seal; and, a fluid control valve for fluid connection between said barrier fluid source and said inlet for said supply of said barrier fluid, and for controlling said supply of barrier fluid to said vessel via said inlet, said fluid control valve including:

a housing having a fluid inlet and a fluid outlet defining a flowpath therebetween, said housing having a chamber located in said flowpath between said fluid inlet and said fluid outlet;

a valve mounted within said chamber for movement being an open position allowing for fluid along said flowpath and a closed position for preventing said flow, said valve including means for preventing fluid flow along said flowpath from said fluid outlet towards said fluid inlet;

means for biassing said valve toward said open position; and, means for regulating fluid pressure for enabling the fluid pressure to be set on an inlet side of said valve.

5. The seal support system according to claim 4, wherein said valve of said fluid control valve includes means for indicating pressure at an outlet side of said valve.

6. A seal support system, comprising:

a vessel for holding barrier fluid, said vessel having an inlet for a supply of said barrier fluid to said vessel from a barrier fluid source;

means for feeding said barrier fluid between said vessel and a mechanical seal; and, a fluid control valve for fluid connection between said barrier fluid source and said inlet for said supply of said barrier fluid, and for controlling said supply of barrier fluid to said vessel via said inlet, said fluid control valve including:

a housing having a fluid inlet and a fluid outlet defining a flowpath therebetween, said housing having a chamber located in said flowpath between said fluid inlet and said fluid outlet;

a valve mounted within said chamber for movement being an open position allowing for fluid along said flowpath and a closed position for preventing said flow, said valve including by-pass means for allowing fluid flow from said fluid inlet to said fluid outlet while said valve is in said closed position;

means for biassing said valve toward said open position; and, means for regulating fluid pressure for enabling the fluid pressure to be set on an inlet side of said valve.

7. The seal support system according to claim 6, wherein said by-pass means for allowing fluid flow is adjustable between said open position, permitting by-pass flow, and said closed position, when said by-pass flow is prevented.

8. The seal support system according to claim 7, wherein said by-pass means is adjustable over a range of open positions permitting said by-pass flow to be variable.

9. The seal support system according to claim 6, wherein said valve of said fluid control valve includes means for indicating pressure at an outlet side of said valve.

10. A seal support system, comprising:

a vessel for holding barrier fluid, said vessel having an inlet for a supply of said barrier fluid to said vessel from a barrier fluid source;

means for feeding said barrier fluid between said vessel and a mechanical seal; and, a fluid control valve for fluid connection between said barrier fluid source and said inlet for said supply of said barrier fluid, and for controlling said supply of barrier fluid to said vessel via said inlet, said fluid control valve including:

a housing having a fluid inlet and a fluid outlet defining a flowpath therebetween, said housing having a chamber located in said flowpath between said fluid inlet and said fluid outlet;

a valve mounted within said chamber for movement being an open position allowing for fluid along said flowpath and a closed position for preventing said flow, said valve including means for visually indicating whether said valve is in said open position or said closed position;

means for biassing said valve toward said open position; and, means for regulating fluid pressure for enabling the fluid pressure to be set on an inlet side of said valve.

11. The seal support system according to claim 1, wherein said valve of said fluid control valve includes means for indicating pressure at an outlet said of said valve.

* * * * *

UNITED STATES PATENT AND TRADEMARK OFFICE
CERTIFICATE OF CORRECTION

| | | |
|---|---|---|
| PATENT NO. | : 7,219,688 B2 | Page 1 of 1 |
| APPLICATION NO. | : 10/929729 | |
| DATED | : May 22, 2007 | |
| INVENTOR(S) | : Nadim Tahir and James Francis McKeever | |

It is certified that error appears in the above-identified patent and that said Letters Patent is hereby corrected as shown below:

Title Page #74 - Attorney-of-Record: Change "Edward D. Schindler" to --Edwin D. Schindler--.

Signed and Sealed this

Twenty-sixth Day of June, 2007

JON W. DUDAS
*Director of the United States Patent and Trademark Office*